(12) United States Patent
Cribiu'

(10) Patent No.: US 9,975,704 B2
(45) Date of Patent: May 22, 2018

(54) MOTORISED ROLLER FOR BELT CONVEYOR HAVING HIGH FRICTION IN RESPECT OF THE BELT

(71) Applicant: CRIZAF S.R.L., Saronno (Varese) (IT)

(72) Inventor: Luca Cribiu', Saronno (IT)

(73) Assignee: CRIZAF S.R.L., Saronno (Varese) (IT)

( * ) Notice: Subject to any disclaimer, the term of this patent is extended or adjusted under 35 U.S.C. 154(b) by 0 days. days.

(21) Appl. No.: 15/029,027

(22) PCT Filed: Oct. 14, 2014

(86) PCT No.: PCT/EP2014/072065
§ 371 (c)(1),
(2) Date: Apr. 13, 2016

(87) PCT Pub. No.: WO2015/055685
PCT Pub. Date: Apr. 23, 2015

(65) Prior Publication Data
US 2016/0257499 A1 Sep. 8, 2016

(30) Foreign Application Priority Data

Oct. 15, 2013 (IT) .............................. MI20130354 U

(51) Int. Cl.
| B65G 39/07 | (2006.01) |
| B65G 39/02 | (2006.01) |
| B65G 23/04 | (2006.01) |
| B65G 23/08 | (2006.01) |

(52) U.S. Cl.
CPC ............ *B65G 39/07* (2013.01); *B65G 23/04* (2013.01); *B65G 23/08* (2013.01); *B65G 39/02* (2013.01); *B65G 2207/48* (2013.01)

(58) Field of Classification Search
CPC ........ B65G 23/04; B65G 23/08; B65G 39/07; B65G 2207/48; B65G 39/02; B65G 39/06
USPC ........... 198/835, 842, 843; 193/37; 474/190, 474/191; 492/48
See application file for complete search history.

(56) References Cited

U.S. PATENT DOCUMENTS

| 3,074,288 A | * | 1/1963 | Newton | ................. | B65G 23/04 |
| | | | | | 198/835 |
| 3,847,260 A | * | 11/1974 | Fowler | .................. | B65G 39/04 |
| | | | | | 193/37 |
| 4,385,683 A | * | 5/1983 | Krupp | .................... | B65G 39/02 |
| | | | | | 193/37 |
| 4,449,958 A | * | 5/1984 | Conrad | .................. | B65G 15/42 |
| | | | | | 198/834 |

(Continued)

FOREIGN PATENT DOCUMENTS

| DE | 23 58 809 A1 | 6/1975 |
| GB | 1 053 516 A | 1/1967 |
| GB | 1053516 | * 1/1967 |

OTHER PUBLICATIONS

International Search Report, dated Feb. 20, 2015, from corresponding PCT application.

*Primary Examiner* — Leslie A Nicholson, III
*Assistant Examiner* — Keith R Campbell
(74) *Attorney, Agent, or Firm* — Young & Thompson

(57) ABSTRACT

A motorized or drive roller (1) of a belt conveyor (100) provides, mounted forcedly thereon, an antiwear tube (3) made of PVC additioned with antiwear additives, so that the belt (2) of the belt conveyor (100) rotates around, and in contact with, the antiwear tube (3).

12 Claims, 3 Drawing Sheets

(56) References Cited

U.S. PATENT DOCUMENTS

| | | | | |
|---|---|---|---|---|
| 5,307,973 A * | 5/1994 | Schmidt | ............... | B65H 23/025 |
| | | | | 226/190 |
| 6,053,307 A * | 4/2000 | Honda | ................... | B65G 15/46 |
| | | | | 198/839 |
| 6,450,325 B1 * | 9/2002 | Devnani | ................ | B65G 23/08 |
| | | | | 198/784 |
| 7,360,644 B1 * | 4/2008 | Lucchi | ................... | B65G 17/08 |
| | | | | 198/850 |
| 7,673,741 B2 * | 3/2010 | Nemedi | ................ | B65G 15/42 |
| | | | | 198/834 |
| 9,169,078 B2 * | 10/2015 | Petack | ................... | B65G 23/04 |
| 2005/0015986 A1 * | 1/2005 | Stebnicki | ............ | B29C 47/0019 |
| | | | | 29/895.32 |

* cited by examiner form
MOTORISED ROLLER FOR BELT CONVEYOR HAVING HIGH FRICTION IN RESPECT OF THE BELT

BACKGROUND OF THE INVENTION

Field of the Invention

The present invention relates to a motorized roller for a belt conveyor provided with a high traction capability in respect of the belt of the conveyor.

More particularly the present invention relates to such a motorized roller without machining which has high friction in respect of the belt.

Description of the Related Art

As is known, belt conveyor are mechanical devices having the function of moving, in a continuous manner, semimanufactured or finished products (placed loose or ordered) along the production lines, for example for the feeding/loading of the products in a production line or for the transfer from one processing station to the next or, again, for the unloading/storage of the finished products.

Belt conveyor are typically made up of a metal framework including the support of the sliding surface of the belt, a drive roller or drive drum (typically the head drum), a reversing idle roller or drum (typically the tail drum), and a belt, closed in a loop, formed by a mat in canvas, rubber (canvas-covered or not), steel or in another suitable material on which the products or semimanufactured goods are placed and transported, in a varyingly ordered manner.

The motion is conferred to the belt by the drive drum which is connected to a motor (generally electric) and whereon the belt winds at one end, while at the other end it passes over a reversing idle drum and optionally over a tension drum which allows the necessary adherence of the belt to be ensured on the motorized drum and excessive lowering cambers to be avoided.

The adherence between motorized roller and belt is, together with the tension of the belt, the conditions necessary for the functioning of the conveyor: it is in order to make the two aforesaid elements (belt and motorized roller) as adherent as possible that machining processes are performed on said motorized roller, such as for example grooves or notches inside which appropriate inserts of material with high friction coefficient are keyed.

Other systems for ensuring the traction of the belt of the conveyor provide for the use of rollers covered by depositing a material with high friction coefficient resulting in a roller made of a single piece. However these types of machining processes of the roller are also expensive.

SUMMARY OF THE INVENTION

The main object of the present invention is, therefore, to provide a motorized roller which overcomes the disadvantages mentioned above and which is without grooves and provided with high adherence to the belts, in the absence of grooves, with high friction when in contact with the belt and which also shows high resistance to loads.

A further object is to provide such a motorized roller which is easy to make, simple and economical.

According to the invention therefore a motorized roller of a belt conveyor is provided which exhibits high friction in respect of the belt so as to guarantee high roller-belt adherence also when the tension of the belt is slightly lower with respect to the operation tension, said motorized roller being characterized in that it has fitted thereon a tubular element in the form of a tube or sheath made of PVC added with of one or more antiwear additives.

The use of a tube or sheath in antiwear PVC, which is fitted on the motorized roller, enables any type of machining of the roller to be avoided which can therefore also be an unfinished roller, with consequent considerable saving in production costs.

Moreover this construction facilitates the replacement of the abrasive element and makes said replacement more economical in that only the tube fitted on the motorized roller is replaced rather than the motorized roller itself with evident economic advantages.

Moreover this system also enables an improvement in the friction coefficient in a simple manner without modifying the conveyor, without increasing the angle of adherence and without altering the tightener of the belt.

In practice the Applicant has found that the application of a tube or sheath in antiwear PVC to a drive motorized roller entails the direct transfer, and without further intermediations, of the friction, which is developed between the motorized roller and the applied tube, to the belt so that the belt is effectively driven by the tube simply and efficiently.

BRIEF DESCRIPTION OF THE DRAWING FIGURES

Further features of the invention will be made clearer by the following detailed description, referred to a purely non-limiting exemplary embodiment thereof, illustrated in the accompanying drawings in which.

Figure 4A:
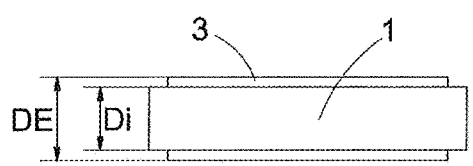

FIGS. 4a) and 4b) are, respectively, a schematic view in longitudinal section of the motorized roller on which a tube in PVC is fitted and a cross section of the tube in PVC only.

DETAILED DESCRIPTION OF THE INVENTION

Figure 1:
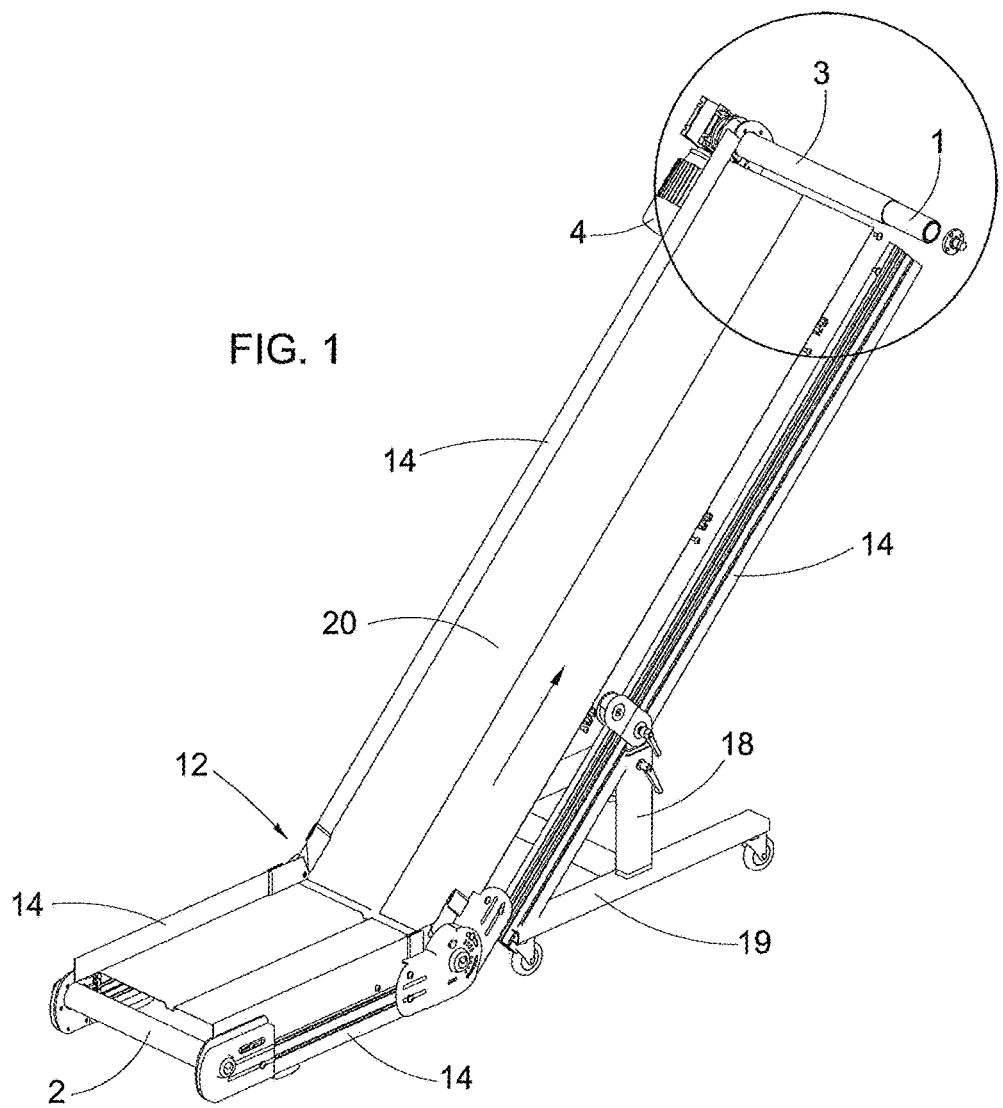
FIG. 1 is a perspective view of a belt conveyor with one side shown blown up and the tube in PVC mounted on the motorized roller.

FIG. 1 illustrates a belt conveyor, denoted overall by reference numeral 100.

It comprises a frame 12 formed by two opposite shoulders 14 and attached stably to the ground by means of a fixed plinth and uprights 18 (with adjustable height) attached to a base 19 which can be moved by means of wheels.

Said frame 12 is divided into two adjacent sections defined as a horizontal section (of loading/unloading) and as a sloping transport section.

The frame 12 also comprises a motorized roller or drum 1 rotatably attached to the sloping section at the tail end thereof and a reversing roller or drum 2 rotatably attached to the horizontal section at the head end thereof, said motorized drum 1 and reversing drum 2 being placed between the two opposite shoulders 14.

A belt 20 which is subtended between the head end of the horizontal section and the tail end of the sloping section is actuated to slide, in the direction of the arrow indicated in FIG. 1, by means of an electric motor 4.

In particular the electric motor 4 rotates the motorized drum 1 so that the belt 20 is driven whereas the reversing drum 2 is an idle drum: in this way there is sliding movement of the belt 20 wound around said drums.

Said belt 20 can be in any suitable material used for the belts of belts conveyor such as PU, PVC, rubberized canvas and the like, with a smooth or wrinkled surface according to the end use.

Figure 2:
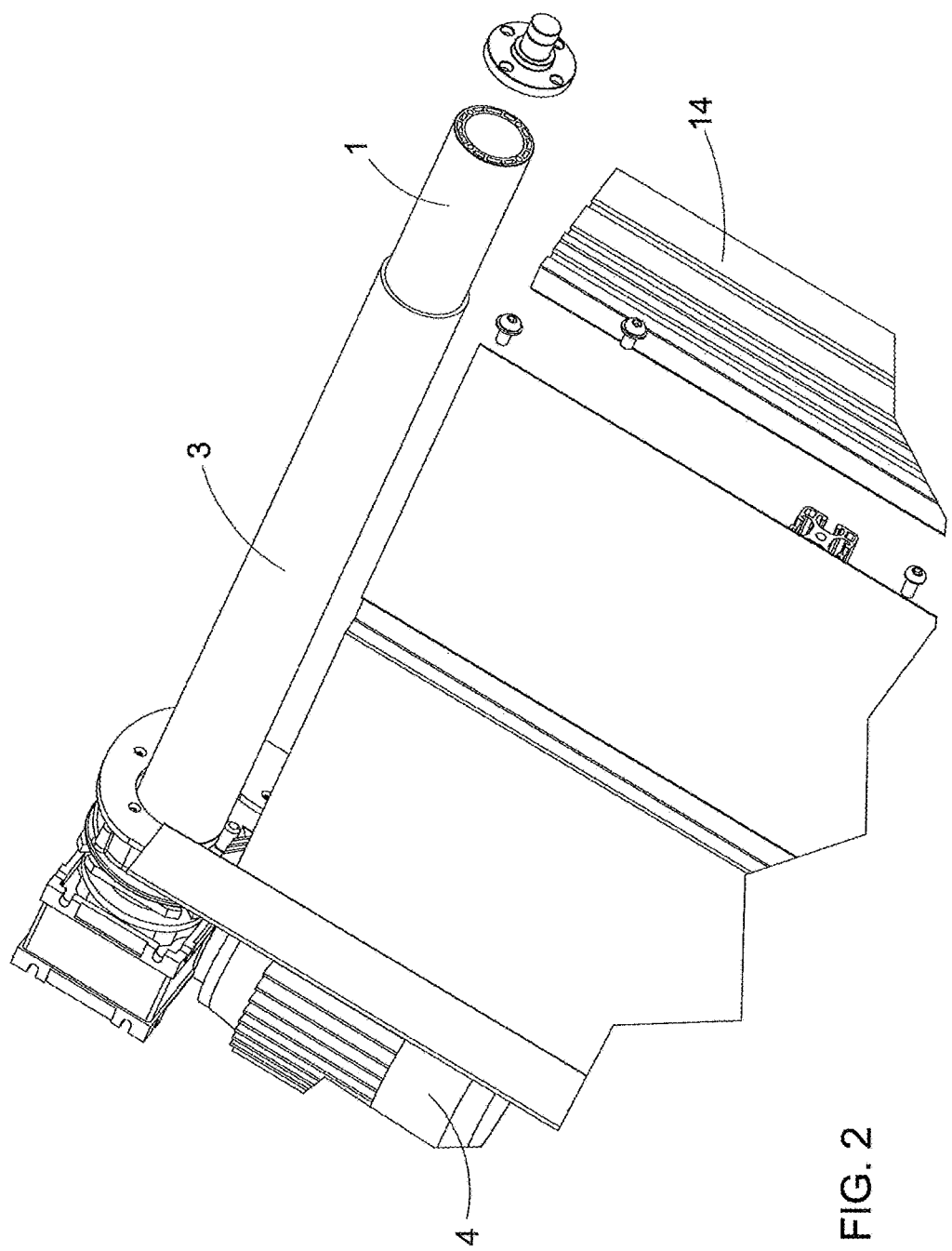
FIG. 2 is an enlarged view of the detail enclosed in the circle denoted by E indicated in FIG. 1.
Figure 3:
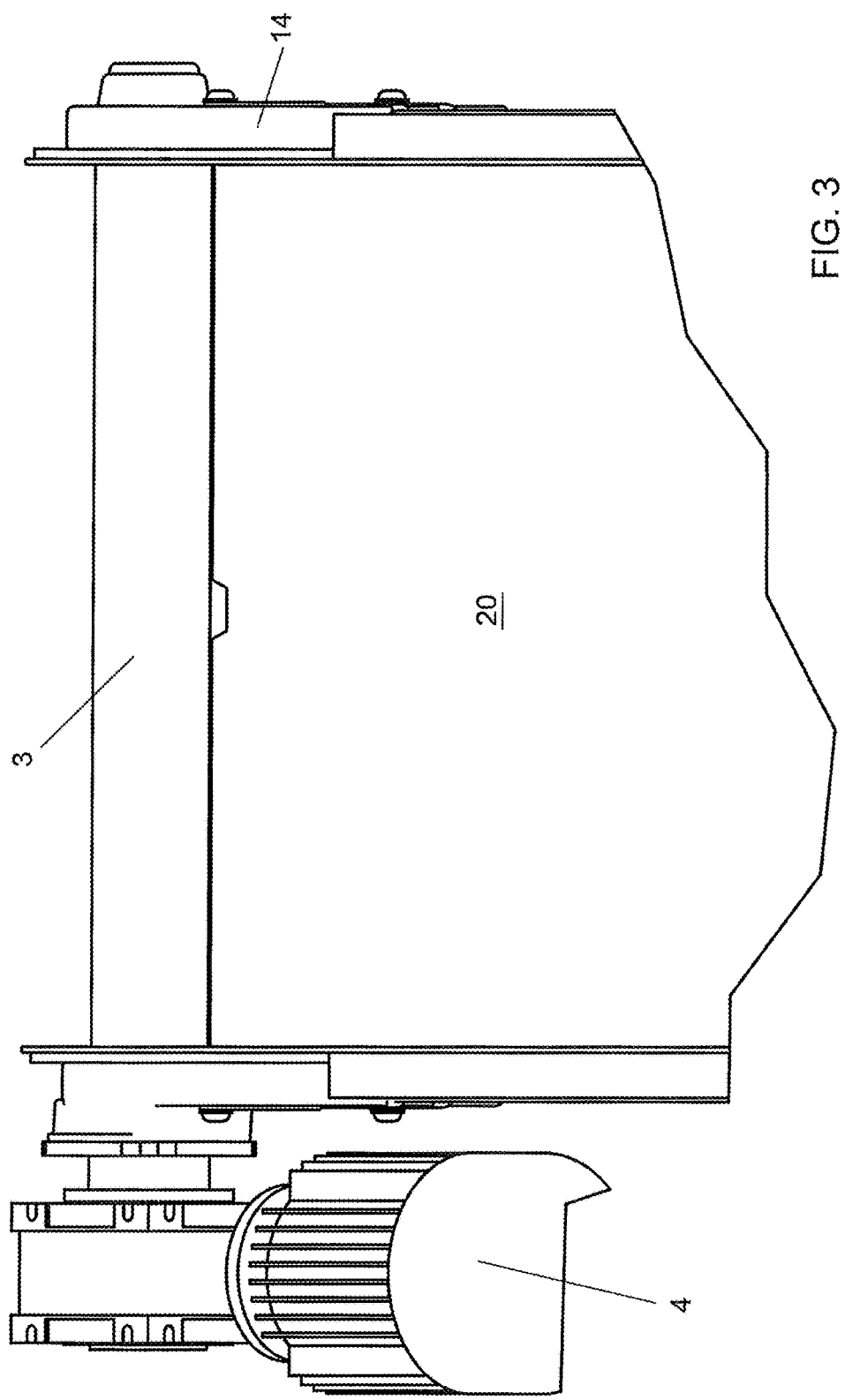
FIG. 3 is a front view, partially interrupted, of the motorized roller on which the tube in PVC is fitted.

A tubular element, in the form of a tube or sheath 3 and made of PVC added with one or more antiwear additives, is fitted in a forced manner on the motorized roller 1 inserting it from the free end of the motorized roller 1 detached from the frame 12. The length of said antiwear tube 3 is smaller than that of the motorised roller 1 (FIG. 2) to allow the ends of the motorized roller 1 to be restrained to the frame 12 (FIG. 3) without obstacles.

After having attached the free end of the motorized roller 1 to the frame 12, the tube in antiwear PVC 3 is found to have the same width of the belt 20 or a slightly smaller width so as to come into contact entirely with the transverse surface of the belt 20.

Figure 4B:
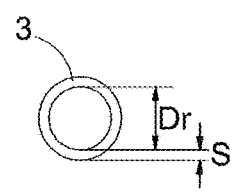

The antiwear sheath or tube 3 generally has a thickness, S, (FIG. 4b) around 3 mm.

Moreover said tube or sheath preferably has such elasticity as to result in a SHORE A hardness of approximately 60-70, and can be made with any internal diameter Dr, which has a coupling fit of transition type (transition fit, "accopiamento incerto") with respect to the outer diameter Di of the motorized roller 1 sufficient in this way for ensuring a coupling with friction between sheath and roller by virtue of the high friction coefficient of the PVC material of the tube.

This type of coupling allows easy assembly of the sheath on the roller without the need for dedicated equipment suitable for widening the inner diameter of the sheath or tube. Numerous detailed changes and modifications may be made to the embodiment of the invention described above within the reach of a person skilled in the art, coming however within the scope of the invention expressed by the appended claims.

The invention claimed is:
1. A belt conveyor, comprising:
   a reversing drum which is idle;
   a frame;
   a motor;
   at least one motorized or drive roller without grooves associated with the motor;
   a belt having a continuous and homogeneous surface, said belt being closed in a loop, wherein a sliding movement of the belt is around said motorized or drive roller and said reversing drum; and
   a replaceable abrasive element mounted only on said at least one motorized or drive roller, said abrasive element being an antiwear elastic tube or sheath having a homogeneous surface formed from PVC containing antiwear additives, so that said belt rotates around, and in contact with, said antiwear elastic tube or sheath, said antiwear elastic tube or sheath directly transferring to the belt friction developed between the at least one motorized or drive roller and the antiwear elastic tube or sheath, so that the belt is driven by the antiwear elastic tube or sheath, wherein
   a length of said antiwear elastic tube or sheath is smaller than that of the motorized or drive roller to allow ends of the motorized or drive roller to be restrained to the frame without obstacles.
2. The belt conveyer according to claim 1, wherein said belt comprises a material chosen from PU, PVC, or rubberized canvas.
3. The belt conveyer according to claim 1, wherein said antiwear elastic tube or sheath comprises PVC and has a length equal to or shorter than a width of the belt so as to come into contact entirely with a transverse surface of the belt.
4. The belt conveyer according to claim 1, wherein said antiwear elastic tube or sheath has a thickness of around 3 mm.
5. The belt conveyer according to claim 1, wherein said antiwear elastic tube or sheath has a SHORE A hardness of approximately 60-70.
6. A motorized roller assembly for driving a belt of a belt conveyor, comprising:
   a reversing drum which is idle;
   a motorized roller without grooves; and
   a replaceable abrasive element transition fit mounted only on said motorized roller, said abrasive element being an antiwear elastic tube or sheath having a homogeneous surface formed from PVC containing antiwear additives, so that when a belt having a continuous and homogeneous surface rotates around, and in contact with, said antiwear elastic tube or sheath, said antiwear elastic tube or sheath directly transfers to the belt friction developed between the motorized roller and the antiwear elastic tube or sheath, so that the belt is driven by the antiwear elastic tube or sheath, wherein
   a sliding movement of the belt is around said motorized roller and said reversing drum, and
   a length of said antiwear elastic tube or sheath is smaller than that of the motorized roller to allow ends of the motorized roller to be restrained to a frame without obstacles.
7. The motorized roller assembly according to claim 6, wherein said antiwear elastic tube or sheath has a thickness of around 3 mm.
8. The motorized roller assembly according to claim 6, wherein said antiwear elastic tube or sheath has a SHORE A hardness of approximately 60-70.
9. An antiwear elastic tube or sheath, comprising:
   PVC containing antiwear additives, said antiwear elastic tube or sheath being a replaceable abrasive element adapted for being fitted only on a motorized drive roller without grooves for the driving with friction of a continuous and homogeneous belt of a belt conveyor, said antiwear elastic tube or sheath having a homogeneous surface, so that said belt rotates around, and in contact with, said antiwear elastic tube or sheath, said antiwear elastic tube or sheath directly transferring to the belt friction developed between the motorized drive roller and the antiwear elastic tube or sheath, so that the belt is driven by the antiwear elastic tube or sheath, wherein
   a sliding movement of the belt is around a motorized or drive roller and a reversing drum which is idle,
   a length of said antiwear elastic tube or sheath is smaller than that of the motorized or drive roller to allow ends of the motorized or drive roller to be restrained to a frame without obstacles.
10. The antiwear elastic tube or sheath according to claim 9, having a diameter as to allow assembly on the drive motorized roller without a need for dedicated equipment for widening an inner diameter of the antiwear elastic tube or sheath.
11. The belt conveyer according to claim 2, wherein said antiwear elastic tube or sheath has a length shorter than that of the at least one motorized drive or roller.

12. The motorized roller assembly according to claim 7, wherein said antiwear elastic tube or sheath has a SHORE A hardness of approximately 60-70.

* * * * *